United States Patent
Zhang et al.

(10) Patent No.: US 11,815,916 B2
(45) Date of Patent: Nov. 14, 2023

(54) METHOD FOR CONTROLLING UNMANNED AERIAL VEHICLE, METHOD FOR CONTROLLING GO AND RETURN TRIP OF UNMANNED AERIAL VEHICLE, UNMANNED AERIAL VEHICLE, MEDIUM, AND CONTROL SYSTEM

(71) Applicants: NANJING NANJI INTELLIGENT AGRICULTURAL MACHINERY TECHNOLOGY RESEARCH INSTITUTE CO., LTD., Jiangsu (CN); NANJING JIAGU-CHUCHENG COMMUNICATION TECHNOLOGY CO., LTD., Jiangsu (CN)

(72) Inventors: Yi Zhang, Nanjing (CN); Muyang Zhang, Nanjing (CN); Hang Yu, Nanjing (CN); Shaobin Li, Nanjing (CN); Panwei Hu, Nanjing (CN)

(73) Assignees: NANJING NANJI INTELLIGENT AGRICULTURAL MACHINERY TECHNOLOGY RESEARCH INSTITUTE CO., LTD., Jiangsu (CN); NANJING JIAGU-CHUCHENG COMMUNICATION TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/924,294
(22) PCT Filed: Nov. 30, 2020
(86) PCT No.: PCT/CN2020/132871
§ 371 (c)(1),
(2) Date: Nov. 9, 2022
(87) PCT Pub. No.: WO2021/227449
PCT Pub. Date: Nov. 18, 2021

(65) Prior Publication Data
US 2023/0120285 A1 Apr. 20, 2023

(30) Foreign Application Priority Data
May 15, 2020 (CN) .......................... 202010409754.8

(51) Int. Cl.
*G05D 1/00* (2006.01)
*B64C 39/02* (2023.01)
(Continued)

(52) U.S. Cl.
CPC ........... *G05D 1/106* (2019.05); *B64C 39/024* (2013.01); *B64U 20/80* (2023.01);
(Continued)

(58) Field of Classification Search
CPC ........ G05D 1/106; G05D 1/00; B64C 39/024; B64C 39/02; B64U 20/80; B64U 2101/20; B64U 2201/10; G01S 19/073
See application file for complete search history.

(56) References Cited

U.S. PATENT DOCUMENTS 6,469,663 B1 * 10/2002 Whitehead .............. G01S 19/46
  342/357.44
9,551,980 B2 * 1/2017 Akcasu .................... G04G 9/00
(Continued)

FOREIGN PATENT DOCUMENTS

CN 105069595 A 11/2015
CN 106444811 A 2/2017
(Continued)

OTHER PUBLICATIONS

International Search Report (English and Chinese) and Written Opinion of the International Searching Authority (Chinese) issued in PCT/CN2020/132871, dated Feb. 25, 2021; ISA/CN.
(Continued)

*Primary Examiner* — Yonel Beaulieu
(74) *Attorney, Agent, or Firm* — Harness, Dickey & Pierce, P.L.C.

(57) ABSTRACT

Disclosed are a method for controlling an unmanned aerial vehicle, a method for controlling outbound and return trips of an unmanned aerial vehicle, an unmanned aerial vehicle,
(Continued)

a medium, and a control system. The method for controlling an unmanned aerial vehicle includes: obtaining, in a process of flying along a target course sent by a first ground station, first positioning auxiliary information sent by the first ground station; adjusting a flight attitude according to the first positioning auxiliary information, to fly along the target course; in a case of determining that a ground station switching condition of the second ground station is satisfied, obtaining the second positioning auxiliary information sent by the second ground station; and adjusting the flight attitude according to the second positioning auxiliary information, to fly along the target course to reach the second location point.

20 Claims, 6 Drawing Sheets

(51) Int. Cl.
  *B64U 20/80* (2023.01)
  *G05D 1/10* (2006.01)
  *G01S 19/07* (2010.01)
  *B64U 101/20* (2023.01)

(52) U.S. Cl.
  CPC ...... *B64U 2101/20* (2023.01); *B64U 2201/10* (2023.01); *G01S 19/073* (2019.08)

(56) References Cited

U.S. PATENT DOCUMENTS

| | | | | |
|---|---|---|---|---|
| 9,886,845 | B2* | 2/2018 | Rhoads | G06V 10/24 |
| 2007/0037582 | A1* | 2/2007 | Mohi | G01S 19/51 |
| | | | | 455/456.1 |
| 2007/0042790 | A1* | 2/2007 | Mohi | G01S 5/0027 |
| | | | | 455/456.5 |
| 2011/0015817 | A1* | 1/2011 | Reeve | G05D 1/0272 |
| | | | | 701/25 |
| 2013/0253822 | A1* | 9/2013 | Fortune | G01C 15/00 |
| | | | | 701/518 |
| 2016/0003948 | A1* | 1/2016 | Loomis | G01S 19/41 |
| | | | | 342/357.26 |
| 2019/0306675 | A1 | 10/2019 | Xue et al. | |
| 2020/0396911 | A1* | 12/2020 | Stouffer | A01G 25/16 |

FOREIGN PATENT DOCUMENTS

| | | |
|---|---|---|
| CN | 106908820 A | 6/2017 |
| CN | 107407729 A | 11/2017 |
| CN | 107493345 A | 12/2017 |
| CN | 107703520 A | 2/2018 |
| CN | 108401520 A | 8/2018 |
| CN | 111025360 A | 4/2020 |

OTHER PUBLICATIONS

Written Opinion of the International Searching Authority (English and Chinese) issued in PCT/CN2020/132871, dated Feb. 25, 2021; ISA/CN.

* cited by examiner

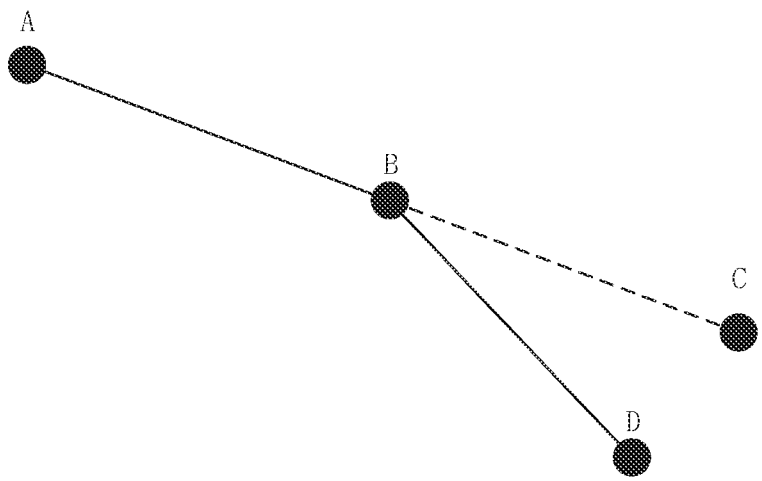

FIG. 1c

| Use a first location point as a starting location point, use a second location point as an ending location point, use a target course as a first course, and fly from the starting location point to the ending location point along the first course by using the method for controlling an unmanned aerial vehicle according to any embodiment of the present invention | ~S210 |

↓

| Use the first location point as an ending location point, use the second location point as a starting location point, use the target course as a second course, and fly from the ending location point to the starting location point along the second course by using the method for controlling an unmanned aerial vehicle according to any embodiment of the present invention | ~S220 |

FIG. 2

METHOD FOR CONTROLLING UNMANNED AERIAL VEHICLE, METHOD FOR CONTROLLING GO AND RETURN TRIP OF UNMANNED AERIAL VEHICLE, UNMANNED AERIAL VEHICLE, MEDIUM, AND CONTROL SYSTEM

CROSS REFERENCE TO RELATED APPLICATIONS

This application is a U.S. National Phase Application under 35 U.S.C. 371 of International Application No. PCT/CN2020/132871, filed on Nov. 30, 2020, which claims priority to China Patent Application No. 202010409754.8, filed on May 15, 2020. The entire disclosures of the above applications are expressly incorporated by reference herein.

TECHNICAL FIELD

Embodiments of the present invention relate to data processing technologies, and in particular, to a method for controlling an unmanned aerial vehicle, a method for controlling outbound and return trips of an unmanned aerial vehicle, an unmanned aerial vehicle, a medium, and a control system.

BACKGROUND

With the development of science and technology, traditional industries are gradually mechanized and informatized, where unmanned aerial vehicles have characteristics of flexible use, small sizes, and low costs, and are thus widely used in various industries.

At present, an unmanned aerial vehicle may fly according to a preset course. In a process of flying along the course, the unmanned aerial vehicle continuously adjusts a flight attitude by positioning a location point thereof, thereby ensuring accurate flight along the course. Therefore, the positioning accuracy determines the flight accuracy of the unmanned aerial vehicle. In the related art, the positioning accuracy of the unmanned aerial vehicle is improved by using a real-time kinematic (RTK) technology.

However, to implement the existing RTK technology, a reference base station usually needs to be pre-disposed. In areas with complex terrains or remote areas, the disposition of the reference base station is difficult and requires high costs, which makes it difficult and costly to achieve high positioning accuracy.

SUMMARY

Embodiments of the present invention provide a method for controlling an unmanned aerial vehicle, a method for controlling outbound and return trips of an unmanned aerial vehicle, an unmanned aerial vehicle, a medium, and a control system, which can improve the positioning accuracy of the unmanned aerial vehicle and reduce the implementation costs of high accuracy.

According to a first aspect, an embodiment of the present invention provides a method for controlling an unmanned aerial vehicle, including:

obtaining, in a process of flying along a target course sent by a first ground station, first positioning auxiliary information sent by the first ground station, the target course being used for instructing an unmanned aerial vehicle to fly from a first location point to a second location point, the target course being generated through the first ground station according to the first location point and the second location point, the first location point being determined through the first ground station, and the second location point being determined through a second ground station;

adjusting a flight attitude according to the first positioning auxiliary information, to fly along the target course;

in a case of determining that a ground station switching condition of the second ground station is satisfied, obtaining the second positioning auxiliary information sent by the second ground station; and adjusting the flight attitude according to the second positioning auxiliary information, to fly along the target course to reach the second location point, the first ground station and the second ground station including mobile terminals.

According to a second aspect, an embodiment of the present invention further provides a method for controlling outbound and return trips of an unmanned aerial vehicle, including:

using a first location point as a starting location point, using a second location point as an ending location point, using a target course as a first course, and flying from the starting location point to the ending location point along the first course by using the method according to any embodiment of the present invention; and using the first location point as an ending location point, using the second location point as a starting location point, using the target course as a second course, and flying from the ending location point to the starting location point along the second course by using the method according to any embodiment of the present invention.

According to a third aspect, an embodiment of the present invention further provides an unmanned aerial vehicle, including a memory, a processor, and a computer program stored in the memory and executable on the processor, the processor, when executing the program, implementing the method for controlling an unmanned aerial vehicle according to any embodiment of the present invention, or implementing the method for controlling outbound and return trips of an unmanned aerial vehicle according to any embodiment of the present invention.

According to a fourth aspect, an embodiment of the present invention further provides a computer-readable storage medium, storing a computer program, the program, when executed by a processor, implementing the method for controlling an unmanned aerial vehicle according to any embodiment of the present invention, or implementing the method for controlling outbound and return trips of an unmanned aerial vehicle according to any embodiment of the present invention.

According to a fifth aspect, an embodiment of the present invention further provides a system for controlling an unmanned aerial vehicle, including: a first ground station, a second ground station, and the unmanned aerial vehicle according to any embodiment of the present invention, where the first ground station is configured to provide first positioning auxiliary information for the unmanned aerial vehicle;

the second ground station is configured to provide second positioning auxiliary information for the unmanned aerial vehicle; and the unmanned aerial vehicle is configured to: adjust a flight attitude according to the first positioning auxiliary information, obtain, in a process of flying along a target course, the second positioning auxiliary information sent by the second ground station in a case of determining that a ground station switching condition of the second ground station is satisfied, adjust the flight attitude according to the second positioning auxiliary information, and continue to fly along the target course, to fly from a first location point to a second location point, the target course being generated through the first ground station according to the first location point and the second location point, the first location point being determined through the first ground station, the second location point being determined through the second ground station, and the first ground station and the second ground station including mobile terminals.

According to the embodiments of the present invention, the first positioning auxiliary information sent by the first ground station matching the first location point is received, positioning is performed based on the first positioning auxiliary information, and the flight attitude is adjusted, thereby achieving accurate flight along the target course. In addition, during the flight, the reception of the second positioning auxiliary information sent by the second ground station matching the second location point is switched to, and the flight attitude is adjusted based on the second positioning auxiliary information, thereby achieving accurate flight along the target course. Meanwhile, the first ground station and the second ground station are both mobile terminals. The mobile terminals are used to provide the positioning auxiliary information for the unmanned aerial vehicle respectively, which resolves the problem in the related art that devices providing positioning auxiliary information need to be pre-disposed, leading to the rising positioning costs of the unmanned aerial vehicle. Temporary mobile terminals may be disposed to provide positioning auxiliary information for the unmanned aerial vehicle, thereby improving the positioning accuracy of the unmanned aerial vehicle, and reducing the implementation costs of high-precision positioning of the unmanned aerial vehicle.

BRIEF DESCRIPTION OF THE DRAWINGS

FIG. 1c is a schematic diagram of a target course according to Embodiment 1 of the present invention;

FIG. 2 is a flowchart of a method for controlling outbound and return trips of an unmanned aerial vehicle according to Embodiment 2 of the present invention;

DETAILED DESCRIPTION

The present invention is further described in detail below with reference to the accompanying drawings and embodiments. It may be understood that specific embodiments described herein are only used to explain the present invention, but not to limit the present invention. In addition, it should be further noted that, for ease of description, the accompanying drawings only show parts relevant to the present invention rather than the entire structure.

Embodiment 1

Figure 1A:
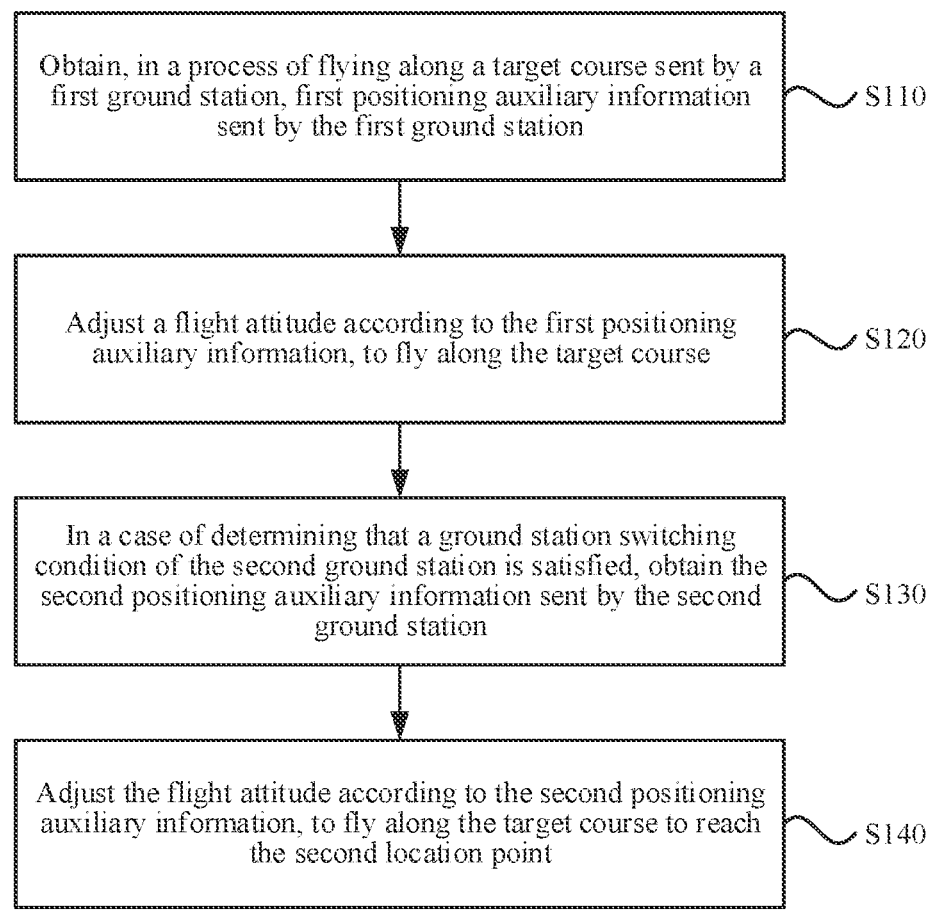
FIG. 1a is a flowchart of a method for controlling an unmanned aerial vehicle according to Embodiment 1 of the present invention.

FIG. 1a is a flowchart of a method for controlling an unmanned aerial vehicle according to Embodiment 1 of the present invention. This embodiment is applicable to a case in which an unmanned aerial vehicle is controlled to fly from a first location point to a second location point. The method may be performed by an apparatus for controlling an unmanned aerial vehicle provided in the embodiments of the present invention. The apparatus may be implemented in a hardware or software manner, and may be generally integrated into an electronic device, for example, an unmanned aerial vehicle. As shown in FIG. 1a, the method in this embodiment further includes the following steps:

S110: Obtain, in a process of flying along a target course sent by a first ground station, first positioning auxiliary information sent by the first ground station, the target course being used for instructing an unmanned aerial vehicle to fly from a first location point to a second location point, the target course being generated through the first ground station according to the first location point and the second location point, the first location point being determined through the first ground station, and the second location point being determined through a second ground station.

The ground stations establish a communication connection with the unmanned aerial vehicle and provide the positioning auxiliary information for the unmanned aerial vehicle. The positioning auxiliary information is provided for the unmanned aerial vehicle to combine positioning information to correct the positioning information, thereby improving the accuracy of the positioning information. Due to the network and other factors, the positioning auxiliary information changes. To ensure the positioning accuracy of the unmanned aerial vehicle, the ground stations usually send positioning auxiliary information according to a preset period. The unmanned aerial vehicle continuously receives the positioning auxiliary information sent in real time and corrects the positioning information in real time, quickly improving the real-time positioning accuracy of the unmanned aerial vehicle. The target course is a flight route of the unmanned aerial vehicle planned by the ground stations. A starting point of the target course is the first location point, and an endpoint of the target course is the second location point. In a specific example, the target course is a straight line from the first location point to the second location point.

The unmanned aerial vehicle is an electronic device with a specific volume. The unmanned aerial vehicle takes off from the first location point, which actually takes off from a region covering the first location point. In addition, the unmanned aerial vehicle lands or hovers at the second location point, which actually lands or hovers in a region covering the second location point. Therefore, a location point may refer to a location range, and the location point may be any point within the referred location range.

The first ground station is near the first location point. Specifically, the first ground station is in the region covering the first location point, for example, in a region with the first location point as a center and a preset distance (for example, 10 km) as a radius. For example, a distance between the first ground station and the first location point is 10 m. Correspondingly, the second ground station is near the second location point. Specifically, the second ground station is in the region covering the second location point, for example, in a region with the second location point as a center and a preset distance (for example, 10 km) as a radius. For example, a distance between the second ground station and the second location point is 10 m.

The first ground station determines the first location point, which may indicate that positioning information of the first location point is relative to positioning information of the first ground station. It may be further understood that the positioning information of the first location point is spatial coordinates in a reference coordinate system established by the first ground station. The second ground station determines the second location point, which may indicate that positioning information of the second location point is relative to positioning information of the second ground station. It may be further understood that the positioning information of the second location point is spatial coordinates in a reference coordinate system established by the second ground station.

The first ground station and the second ground station may communicate to transmit the first location point and the second location point. Specifically, both the first ground station and the second ground station establish a communication connection with a server. The first ground station may receive information about the second location point sent by the second ground station through the server, and correspondingly, the second ground station may receive information about the first location point sent by the first ground station through the server. The first ground station may generate a target course according to the first location point and the second location point, and send the target course to the unmanned aerial vehicle, so that the unmanned aerial vehicle takes off from the first location point and flies along the target course.

S120: Adjust a flight attitude according to the first positioning auxiliary information, to fly along the target course.

Current first positioning information is obtained in real time, and the first positioning information is corrected according to the first positioning auxiliary information, to determine the corrected and more accurate positioning information. Based on the corrected positioning information and location information of each flight point on the target course, the unmanned aerial vehicle adjusts the flight attitude and flies to a next flight point. Specifically, the flight attitude is used for describing a flight state of the unmanned aerial vehicle, which may further include a flight speed, a flight acceleration, a flight angle (for example, at least one of a pitch angle, a yaw angle, or a roll angle), a flight height, and the like.

S130: In a case of determining that a ground station switching condition of the second ground station is satisfied, obtain the second positioning auxiliary information sent by the second ground station.

The ground station switching condition of the second ground station is used for determining whether the unmanned aerial vehicle switches a positioning auxiliary information source from the first ground station to the second ground station. Specifically, a manner of switching the positioning auxiliary information source from the first ground station to the second ground station is to switch from obtaining the first positioning auxiliary information sent by the first ground station to obtaining the second positioning auxiliary information sent by the second ground station. Specifically, the ground station switching condition may be to determine whether a signal strength of the second ground station received by the unmanned aerial vehicle is higher than a signal strength of the first ground station. In addition, the ground station switching condition may be alternatively to determine whether a distance between the unmanned aerial vehicle and the second ground station is less than or equal to a distance between the unmanned aerial vehicle and the first ground station. Specifically, the specific content of the ground station switching condition may be set as required, which is not specifically limited in the embodiments of the present invention.

In fact, when starting to fly along the target course sent by the first ground station, the unmanned aerial vehicle establishes a communication connection with the first ground station and the second ground station respectively, and receives the first positioning auxiliary information sent by the first ground station and the second positioning auxiliary information sent by the second ground station respectively. It may be understood that due to a specific distance between the second ground station and the unmanned aerial vehicle, the quality of transmitted wireless signals is low. For example, the unmanned aerial vehicle cannot obtain the second positioning auxiliary information, which further leads to a decrease in positioning accuracy. Further, auxiliary positioning may be first performed according to the received first positioning auxiliary information sent by the first ground station, and when the quality of the wireless signals of the second ground station is good, auxiliary positioning is performed according to the second positioning auxiliary information sent by the second ground station, thereby maintaining high-precision positioning at all times during flight according to the target course.

Optionally, the determining that a ground station switching condition of the second ground station is satisfied includes: obtaining a signal strength of the first ground station and a signal strength of the second ground station, and determining a target ground station with a higher signal strength; and determining that the ground station switching condition of the second ground station is satisfied in a case of determining that the target ground station is the second ground station.

The signal strength is used for evaluating a strength of a wireless signal between the ground station and the unmanned aerial vehicle, which may refer to received signal strength indication (RSSI). The unmanned aerial vehicle establishes a communication connection with both the first ground station and the second ground station respectively. After the communication connection is established, the signal strength of the first ground station and the signal strength of the second ground station may be obtained respectively, and compared. If the signal strength of the second ground station is higher than or equal to the signal strength of the first ground station, it is determined that the ground station switching condition of the second ground station is satisfied, and ground station switching may be performed in this case.

The signal strength of the first ground station is compared with the signal strength of the second ground station, and when the signal strength of the first ground station is less than or equal to the signal strength of the second ground station, the reception of the positioning auxiliary information sent by the second ground station is switched to, which can ensure that the unmanned aerial vehicle obtains positioning auxiliary information in real time, thereby improving the positioning accuracy of the unmanned aerial vehicle in real time.

In fact, due to factors such as the weather or the network, the signal strength of the second ground station and the signal strength of the first ground station both fluctuate. To ensure the positioning accuracy of the unmanned aerial vehicle, the positioning auxiliary information source may be switched in real time. Specifically, during the flight of the unmanned aerial vehicle along the target course, the signal strength of the second ground station and the signal strength of the first ground station may be periodically compared, and the ground station with the highest signal strength may be determined. If the ground station with the highest signal strength is not the current ground station, the current ground station may be switched.

In addition, when the unmanned aerial vehicle switches the positioning auxiliary information source from the first ground station to the second ground station, corrected positioning information before the switching is different from corrected positioning information after the switching. As a result, the flight attitude adjusted based on the corrected positioning information changes abruptly. If there is an obstacle in front of the flying unmanned aerial vehicle in this case, a flight accident may easily occur. Therefore, the unmanned aerial vehicle needs to hover before the switching and perform obstacle detection in advance.

Optionally, the method for controlling an unmanned aerial vehicle further includes: performing an obstacle detection operation within a set distance range in a forward flight direction during the flight along the target course sent by the first ground station; raising by a set height vertically in a case of determining that there is an obstacle; and waiting for a preset time, returning to perform the obstacle detection operation, and continuing to fly in the forward flight direction until an obstacle detection result is empty.

The obstacle detection operation is used for detecting whether there is an obstacle in front of the nose of the unmanned aerial vehicle. If there is an obstacle, obstacle avoidance is required. To adjust the flight attitude of the unmanned aerial vehicle, a distance between the unmanned aerial vehicle and the obstacle, a type of angle that needs to be adjusted, an adjustment value of the angle, and the like need to be calculated. The calculation amount is large, and the computing performance of the unmanned aerial vehicle is required to be high. The unmanned aerial vehicle is raised when an obstacle is detected, which can reduce the implementation costs of obstacle avoidance, and simplify the obstacle avoidance operation.

The set distance range may be determined by a flight speed of the unmanned aerial vehicle and the environmental complexity. It may be understood that, a higher flight speed of the unmanned aerial vehicle indicates a larger set distance range; and a lower flight speed of the unmanned aerial vehicle indicates a smaller set distance range. Therefore, the set distance range is proportional to the flight speed of the unmanned aerial vehicle. Higher environmental complexity (indicating that there are many obstacles in the environment) indicates a smaller set distance range, and lower environmental complexity of the unmanned aerial vehicle indicates a larger set distance range. Therefore, the set distance range is inversely proportional to the flight speed of the unmanned aerial vehicle. In addition, the set distance range may be alternatively determined according to other parameters, which is not specifically limited in the present invention.

The set height may be determined according to the environmental complexity. It may be understood that higher environmental complexity indicates a greater set height, and lower environmental complexity of the unmanned aerial vehicle indicates a smaller set height. Therefore, the set height is proportional to the flight speed of the unmanned aerial vehicle. In addition, the set distance range may be alternatively determined according to other parameters, which is not specifically limited in the present invention. The environmental complexity may be calculated through a picture obtained by photographing a forward direction of flight by the unmanned aerial vehicle. For example, more objects included in the picture indicate higher environmental complexity; and fewer objects included in the picture indicate lower environmental complexity. In addition, the environmental complexity may be alternatively calculated in other manners, which is not specifically limited in the present invention.

The preset time is used for determining a frequency of obstacle detection and may be set according to the actual situation. For example, the preset time may be determined according to a priority of a flight task. For example, a flight task with a higher priority indicates more urgency, and the preset time is shorter; and a flight task with a lower priority has a longer preset time.

The set distance range, the set height, and the preset time may all be set as required, which are not specifically limited in the present invention.

For example, the set distance range is 0-30 m, the set height is 10 m, and the preset time is 200 ms.

Figure 1B:
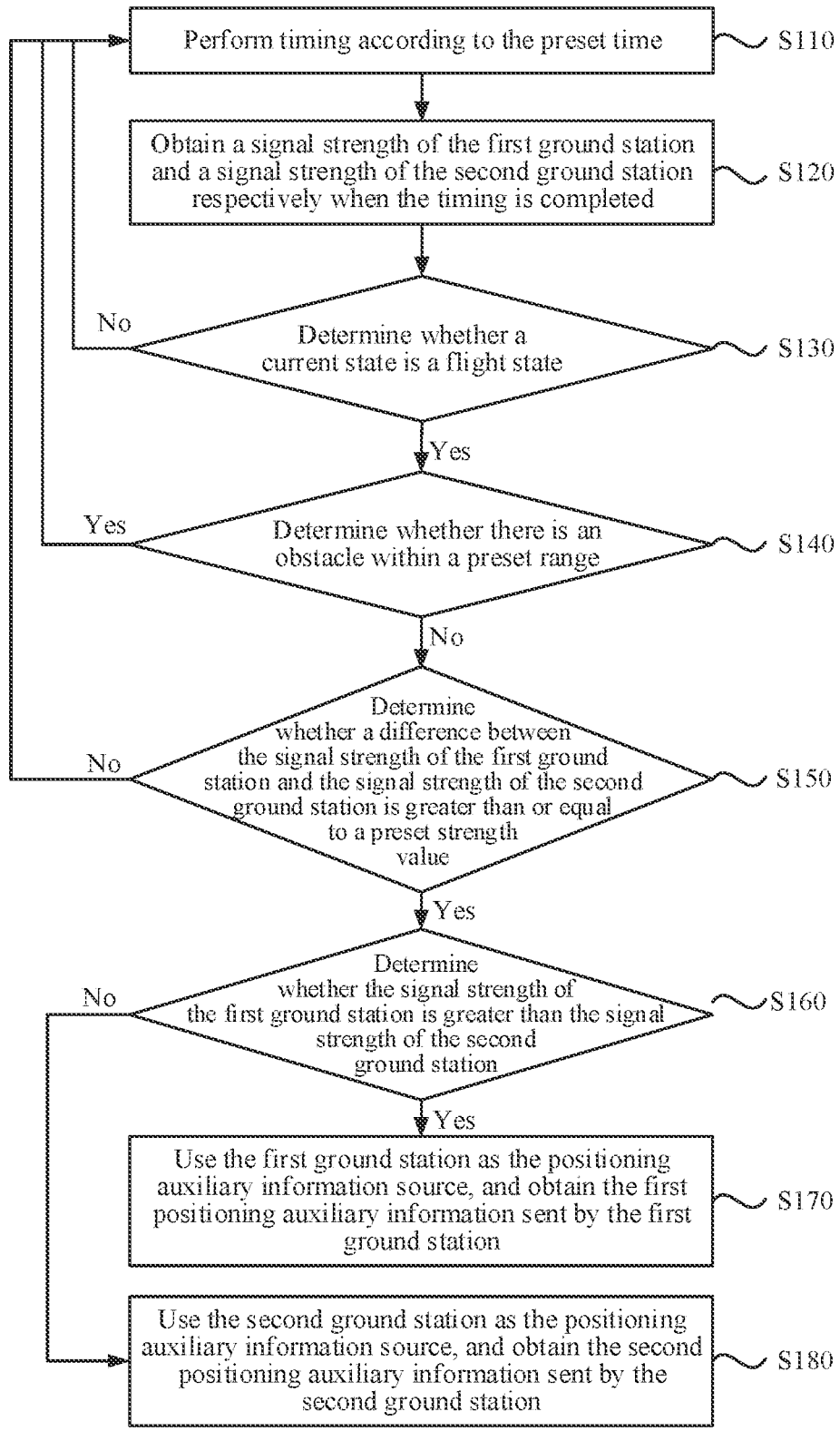
FIG. 1B is a flowchart of a method for switching a positioning auxiliary information source according to Embodiment 1 of the present invention.

Specifically, as shown in FIG. 1B, the method for controlling an unmanned aerial vehicle may further include the following steps:

S101: Perform timing according to the preset time.

The preset time may be 200 ms, and may be alternatively determined according to the flight speed of the unmanned aerial vehicle, or may be set according to other information, which is not specifically limited in the embodiments of the present invention.

S102: Obtain a signal strength of the first ground station and a signal strength of the second ground station respectively when the timing is completed.

The signal strength is RSSI.

S103: Determine whether a current state is a flight state, and if yes, perform S104; otherwise, perform S101.

It may be understood that only after the unmanned aerial vehicle takes off, does the unmanned aerial vehicle need to determine whether to switch the positioning auxiliary information source. If the unmanned aerial vehicle does not take off, the unmanned aerial vehicle does not need to obtain positioning auxiliary information, and does not need to determine whether to switch the positioning auxiliary information source.

S104: Determine whether there is an obstacle within a preset range, and if yes, perform S101; otherwise, perform S105.

Ultrasonic ranging may be used to determine whether there is an obstacle within the preset range in front of the unmanned aerial vehicle. Specifically, it is determined whether there is an obstacle within 30 m of a navigation direction of the unmanned aerial vehicle.

S105: Determine whether a difference between the signal strength of the first ground station and the signal strength of the second ground station is greater than or equal to a preset strength value, and if yes, perform S106; otherwise, perform S101.

The preset strength value may be 6 dB, or may be other values, which may be set according to the actual situation and is not specifically limited in the embodiments of the present invention.

S106: Determine whether the signal strength of the first ground station is greater than the signal strength of the second ground station, and if yes, perform S107; otherwise, perform S108.

S107: Use the first ground station as the positioning auxiliary information source, and obtain the first positioning auxiliary information sent by the first ground station.

S108: Use the second ground station as the positioning auxiliary information source, and obtain the second positioning auxiliary information sent by the second ground station.

When an obstacle is detected ahead, the positioning auxiliary information source is not switched, and the obstacle detection is continued after waiting for the preset time. Only when there is no obstacle ahead, the positioning auxiliary information source is switched, to avoid a safety accident caused by a sudden change in the flight attitude due to a sudden change in the positioning information determined based on the positioning auxiliary information that is caused by the switching of the positioning auxiliary information source when there is an obstacle ahead, thereby improving the flight safety of the unmanned aerial vehicle.

In addition, optionally, in a case of determining that a ground station switching condition of the second ground station is satisfied, the method further includes: stopping flying, and hovering at a current location point; and the adjusting the flight attitude according to the second positioning auxiliary information includes: adjusting a flight direction according to the second positioning auxiliary information; and ending the hovering, and continuing to fly in the adjusted flight direction.

When it is determined to switch the ground station, the unmanned aerial vehicle hovers, and after adjusting the flight direction, continues to fly, which can reduce a yaw distance of the unmanned aerial vehicle and improve the efficiency of adjusting the flight direction of the unmanned aerial vehicle. In addition, hovering can further avoid encountering obstacles when the flight direction is adjusted, improving the flight safety.

S140: Adjust the flight attitude according to the second positioning auxiliary information, to fly along the target course to reach the second location point, the first ground station and the second ground station including mobile terminals.

The ground stations are mobile terminals and are movable. Therefore, the ground stations may be temporarily dispatched from other regions, thereby avoiding re-establishing base stations. Specifically, the mobile terminal may be a mobile phone, an in-vehicle device, a notebook computer, a robot, an on-board device, or the like.

Optionally, the first positioning auxiliary information includes real-time kinematic data, and the second positioning auxiliary information includes real-time kinematic data; the adjusting a flight attitude according to the first positioning auxiliary information includes: obtaining first positioning information, and correcting the first positioning information according to the first positioning auxiliary information, to convert the first positioning information into positioning information in a reference coordinate system of the first ground station; and adjusting the flight attitude according to the corrected first positioning information and the target course; and the adjusting the flight attitude according to the second positioning auxiliary information includes: obtaining second positioning information, and correcting the second positioning information according to the second positioning auxiliary information, to convert the second positioning information into positioning information in a reference coordinate system of the second ground station; and adjusting the flight attitude according to the corrected second positioning information and the target course.

The ground stations use the RTK technology to obtain the real-time kinematic data. Specifically, the ground station receives site coordinates thereof and known site coordinates detected by the Global Positioning System (GPS), and calculates correction data. The unmanned aerial vehicle corrects positioning information thereof obtained through GPS positioning according to the correction data, to obtain more accurate positioning information.

The real-time kinematic data includes the foregoing correction data, and is used for correcting positioning information obtained by an unmanned aerial vehicle observation satellite. The first positioning auxiliary information includes real-time kinematic data, and the second positioning auxiliary information includes real-time kinematic data, indicating that the unmanned aerial vehicle uses the RTK technology to improve the positioning accuracy during the flight along the target course, and ensures that the positioning accuracy of the entire target course is improved. The first positioning auxiliary information is sent by the first ground station to the unmanned aerial vehicle in the form of RTCM signals, and the second positioning auxiliary information is sent by the second ground station to the unmanned aerial vehicle in the form of RTCM signals. RTCM is a differential signal format specified by the Radio Technical Commission for Maritime Services.

It may be understood that correction data obtained by different ground stations are different, that is, real-time kinematic data are different. Therefore, corrected positioning information of the unmanned aerial vehicle obtained according to the first positioning auxiliary information and the second positioning auxiliary information, respectively are different. Therefore, the corrected positioning information obtained according to the first positioning auxiliary information is a spatial location in the reference coordinate system established by the first ground station; and the corrected positioning information obtained according to the second positioning auxiliary information is a spatial location in the reference coordinate system established by the second ground station. Correspondingly, the flight attitude is adjusted according to different corrected positioning information, and the flight attitudes after the adjustment are different.

In a specific example, as shown in FIG. 1c, the target course is a course generated through the first location point and a second location C in the reference coordinate system established by the first ground station. The unmanned aerial vehicle obtains the first positioning auxiliary information sent by the first ground station for auxiliary positioning in the first half of the course, and obtained corrected positioning information is a coordinate location in the reference coordinate system established by the first ground station. When the unmanned aerial vehicle switches the positioning auxiliary information source to the second ground station, for example, when the unmanned aerial vehicle is at the second location point and obtains the second positioning auxiliary information sent by the second ground station in the second half of the course for auxiliary positioning, the obtained corrected positioning information is a coordinate location in the reference coordinate system established by the second ground station. Correspondingly, the unmanned aerial vehicle continues to fly according to the target course, but in this case, flight points of the target course are all coordinate locations in the reference coordinate system established by the second ground station. Therefore, the endpoint of the target course is converted from the second location C in the reference coordinate system established by the first ground station to a second location D in the reference coordinate system established by the second ground station. Correspondingly, the actual target course of the unmanned aerial vehicle is switched from flying from the first location point in the reference coordinate system established by the first ground station to the second location C to: flying from the first location point in the reference coordinate system established by the first ground station to the second location point, and then flying from the second location point to the second location D in the reference coordinate system established by the second ground station.

The positioning auxiliary information transmitted in the form of RTCM signals is received, and the positioning information is corrected based on the positioning auxiliary information, thereby improving the positioning accuracy of the unmanned aerial vehicle.

According to the embodiments of the present invention, the first positioning auxiliary information sent by the first ground station matching the first location point is received, positioning is performed based on the first positioning auxiliary information, and the flight attitude is adjusted, thereby achieving accurate flight along the target course. In addition, during the flight, the reception of the second positioning auxiliary information sent by the second ground station matching the second location point is switched to, and the flight attitude is adjusted based on the second positioning auxiliary information, thereby achieving accurate flight along the target course. Meanwhile, the first ground station and the second ground station are both mobile terminals. The mobile terminals are used to provide the positioning auxiliary information for the unmanned aerial vehicle respectively, which resolves the problem in the related art that devices providing positioning auxiliary information need to be pre-disposed, leading to the rising positioning costs of the unmanned aerial vehicle. Temporary mobile terminals may be disposed to provide positioning auxiliary information for the unmanned aerial vehicle, thereby improving the positioning accuracy of the unmanned aerial vehicle, and reducing the implementation costs of high-precision positioning of the unmanned aerial vehicle.

Embodiment 2

FIG. 2 is a flowchart of a method for controlling outbound and return trips of an unmanned aerial vehicle according to Embodiment 2 of the present invention. This embodiment is applicable to a case in which an unmanned aerial vehicle is controlled to fly from a starting point to an endpoint, and then return to the starting point from the endpoint. The method may be performed by an apparatus for controlling outbound and return trips of an unmanned aerial vehicle provided in the embodiments of the present invention. The apparatus may be implemented in a hardware or software manner, and may be generally integrated into an electronic device, for example, an unmanned aerial vehicle. As shown in FIG. 2, the method in this embodiment further includes the following steps:

S210: Use a first location point as a starting location point, use a second location point as an ending location point, use a target course as a first course, and fly from the starting location point to the ending location point along the first course by using the method for controlling an unmanned aerial vehicle according to any embodiment of the present invention.

It should be noted that, for content not described in detail in this embodiment, refer to the descriptions in the foregoing embodiment.

Optionally, before the flying from the starting location point to the ending location point along the first course, the method further includes: obtaining, in a case of determining a take-off location point, coordinates of the location point as the starting location point, the coordinates being obtained through positioning by a real-time kinematic module.

The unmanned aerial vehicle moves to a take-off location point in advance, and is positioned by using the real-time kinematic module. Detected coordinates of the current location point are used as the starting location point, so that the unmanned aerial vehicle takes off from the starting location point subsequently. It should be noted that, in the take-off process of the unmanned aerial vehicle, the unmanned aerial vehicle rises vertically from the starting location point, and when raising by a set height (for example, 10 m), adjusts a flight attitude according to the course and starts flying along the course.

In fact, both the first ground station and the second ground station use real-time kinematic modules for positioning, and provided positioning auxiliary information is real-time kinematic data. Therefore, the unmanned aerial vehicle uses the real-time kinematic module for positioning, which can avoid positioning errors caused by different positioning methods, thereby improving the positioning accuracy.

The unmanned aerial vehicle uses a method for controlling an unmanned aerial vehicle to fly from the starting location point to the ending location point. The unmanned aerial vehicle obtains the first course sent by the ground station near the starting location point, and flies along the first course from the starting location point to the ending location point. The ground station associated with the starting location point, that is, the ground station near the starting location point, obtains the starting location point sent by the unmanned aerial vehicle, and obtains the ending location point sent by the ground station near the ending location point, to generate the first course.

In the process of flying along the first course, the unmanned aerial vehicle obtains first positioning auxiliary information sent by the ground station associated with the starting location point, corrects obtained current positioning information, to obtain the corrected positioning information, and adjusts the flight attitude according to the first course to fly along the first course. In a case of determining that a ground station switching condition of the ground station (that is, the ground station near the ending location point) associated with the ending location point is satisfied, the unmanned aerial vehicle obtains second positioning auxiliary information sent by the ground station associated with the ending location point; and corrects the obtained current positioning information according to the second positioning auxiliary information to obtain the corrected positioning information, and adjusts the flight attitude according to the first course to fly along the first course and reach the ending location point. The ground station associated with the starting location point and the ground station associated with the ending location point are both mobile terminals, which may transmit data through mobile communication.

Optionally, before the flying from the starting location point to the ending location point along the first course, the method further includes: using a first ground station as a starting point ground station, and using a second ground station as an endpoint ground station; sending, by the unmanned aerial vehicle, the starting location point to the starting point ground station to instruct the starting point ground station to generate the first course according to the received ending location point sent by the endpoint ground station and the starting location point; and receiving, by the unmanned aerial vehicle, the first course.

In fact, before the unmanned aerial vehicle takes off from the starting location point, the starting point ground station obtains the starting location point provided by the unmanned aerial vehicle, and obtains the ending location point provided by the endpoint ground station through mobile communication, to generate the first course from the starting location point to the ending location point.

The starting location point is determined by the unmanned aerial vehicle, and the ending location point is determined by the endpoint ground station, so that the starting point and the endpoint can be accurately determined, thereby ensuring the accuracy of the first course, ensuring that the unmanned aerial vehicle can accurately fly from the starting point to the endpoint, and ensuring that a cargo is correctly transported or the unmanned aerial vehicle flies correctly.

S220: Use the first location point as an ending location point, use the second location point as a starting location point, use the target course as a second course, and fly from the ending location point to the starting location point along the second course by using the method for controlling an unmanned aerial vehicle according to any embodiment of the present invention.

The unmanned aerial vehicle uses the method for controlling an unmanned aerial vehicle to fly from the ending location point to the starting location point. The unmanned aerial vehicle obtains the second course sent by the ground station associated with the ending location point, and flies along the second course from the ending location point to the starting location point. The ground station associated with the ending location point obtains the starting location point sent by the unmanned aerial vehicle, or may obtain the starting location point sent by the ground station associated with the starting location point. The ground station associated with the ending location point obtains the pre-determined ending location point, and generates the second course according to the pre-obtained starting location point.

In the process of flying along the second course, the unmanned aerial vehicle obtains third positioning auxiliary information sent by the ground station associated with the ending location point, corrects obtained current positioning information, to obtain the corrected positioning information, and adjusts the flight attitude according to the second course to fly along the second course. In a case of determining that a ground station switching condition of the ground station associated with the starting location point is satisfied, the unmanned aerial vehicle obtains fourth positioning auxiliary information sent by the ground station associated with the starting location point; and corrects the obtained current positioning information according to the fourth positioning auxiliary information to obtain the corrected positioning information, and adjusts the flight attitude according to the second course to fly along the second course and reach the starting location point.

Optionally, before the flying from the ending location point to the starting location point along the second course, the method further includes: using a first ground station as a starting point ground station, and using a second ground station as an endpoint ground station; sending, by the unmanned aerial vehicle, the starting location point to the endpoint ground station to instruct the endpoint ground station to generate the second course according to the predetermined ending location point and the starting location point; and receiving, by the unmanned aerial vehicle, the second course.

In fact, the ending location point is determined by the endpoint ground station. For example, the ending location point is first moved to the endpoint, and positioning is performed to determine the ending location point, or coordinates of the ending location point are directly manually inputted to determine the ending location point.

Before the unmanned aerial vehicle takes off from the ending location point, the endpoint ground station obtains the starting location point provided by the unmanned aerial vehicle, and generates the second course from the ending location point to the starting location point through the predetermined ending location point.

It should be noted that, the unmanned aerial vehicle performs auxiliary positioning through the second positioning auxiliary information sent by the endpoint ground station. In this case, a positioning coordinate system established by the unmanned aerial vehicle is a coordinate system of the endpoint ground station. Therefore, the starting location point provided by the unmanned aerial vehicle is directly coordinates in the coordinate system of the endpoint ground station, thereby ensuring the accuracy of the coordinates of the endpoint. Further, the endpoint ground station determines the second course according to more accurate coordinates, thereby improving the accuracy of the second course.

The starting location point is determined by the unmanned aerial vehicle, and the ending location point is pre-determined, so that the starting point and the endpoint can be accurately determined, thereby ensuring the accuracy of the second course, ensuring that the unmanned aerial vehicle can accurately fly from the endpoint to the starting point, and ensuring that a cargo is correctly transported or the unmanned aerial vehicle returns correctly.

The unmanned aerial vehicle may be a logistics unmanned aerial vehicle that is configured to transport a cargo from a starting location point to an ending location point, or transport the cargo from the ending location point to the starting location point.

Optionally, the flying from the starting location point to the ending location point along the first course includes: flying from the starting location point to the ending location point along the first course in an unloaded state; and the flying from the ending location point to the starting location point along the second course includes: flying from the ending location point to the starting location point along the second course with a to-be-transported cargo carried, the to-be-transported cargo being unloaded at the starting location point.

The unmanned aerial vehicle moves to the starting location point in advance, and when receiving a take-off instruction, starts to take off from the starting location point and flies along the first course until reaching the ending location point.

After the unmanned aerial vehicle arrives at the ending location point, a user at the ending location point loads the unmanned aerial vehicle with the to-be-transported cargo. After the loading is completed, the unmanned aerial vehicle starts to take off from the ending location point when receiving the take-off instruction and flies along the second course, and then lands when reaching the starting location point. A user at the starting location point unloads the to-be-transported cargo from the unmanned aerial vehicle. Alternatively, the unmanned aerial vehicle hovers at the starting location point, and puts the to-be-transported cargo at the starting location point. The user at the starting location point obtains the to-be-transported cargo, thereby transporting the to-be-transported cargo from the ending location point to the starting location point.

Optionally, the flying from the starting location point to the ending location point along the first course includes: flying from the starting location point to the ending location point along the first course with a to-be-transported cargo carried, the to-be-transported cargo being unloaded at the ending location point; and the flying from the ending location point to the starting location point along the second course includes: flying from the ending location point to the starting location point along the second course in an unloaded state.

The unmanned aerial vehicle moves to the starting location point in advance, the user at the starting location point loads the unmanned aerial vehicle with the to-be-transported cargo. After the loading is completed, the unmanned aerial vehicle starts to take off from the starting location point when receiving the take-off instruction and flies along the first course, and then lands when reaching the ending location point. The user at the ending location point unloads the to-be-transported cargo from the unmanned aerial vehicle. Alternatively, the unmanned aerial vehicle hovers at the ending location point, and puts the to-be-transported cargo at the ending location point. The user at the ending location point obtains the to-be-transported cargo, thereby transporting the to-be-transported cargo from the starting location point to the ending location point.

After landing at the ending location point, the unmanned aerial vehicle starts to take off from the ending location point when receiving the take-off instruction and flies along the second course until reaching the starting location point.

According to the embodiments of the present invention, the mobile terminals are used as ground stations, and the foregoing method for controlling an unmanned aerial vehicle is used, so that the unmanned aerial vehicle flies from the starting location point to the ending location point, and then return from the ending location point to the starting location point. Accurate positioning is performed based on the positioning auxiliary information on the courses of the outbound and return trips, which improves the positioning accuracy of the unmanned aerial vehicle, reduces the implementations costs of high-precision positioning of the unmanned aerial vehicle, and ensures accurate flight along the courses, thereby ensuring the accurate operation of the unmanned aerial vehicle.

Embodiment 3

Figure 3:
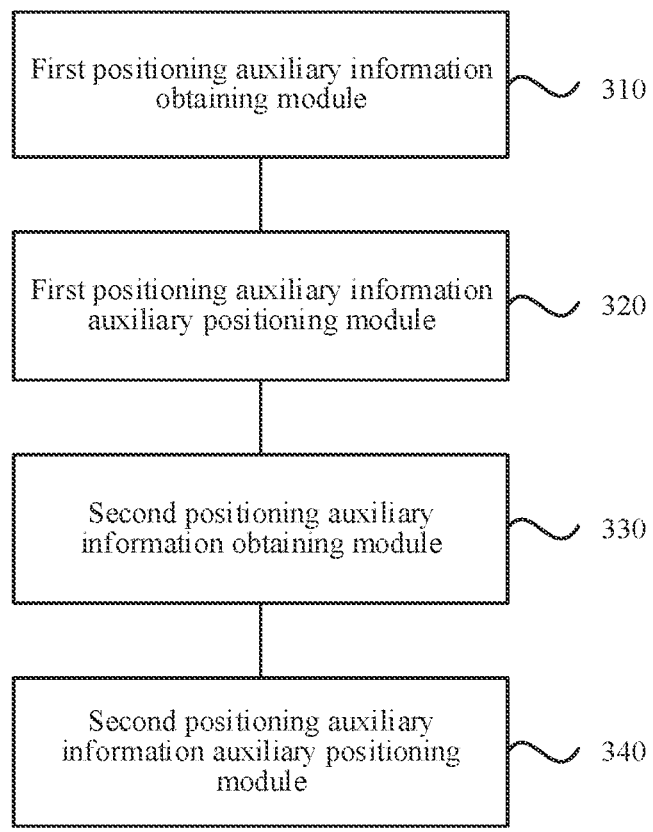
FIG. 3 is a structural diagram of an apparatus for controlling an unmanned aerial vehicle according to Embodiment 3 of the present invention.

FIG. 3 is a schematic diagram of an apparatus for controlling an unmanned aerial vehicle according to Embodiment 3 of the present invention. Embodiment 3 is a corresponding apparatus for implementing the method for controlling an unmanned aerial vehicle provided in the foregoing embodiments of the present invention.

Correspondingly, the apparatus of this embodiment may include:
  a first positioning auxiliary information obtaining module 310, configured to obtain, in a process of flying along a target course sent by a first ground station, first positioning auxiliary information sent by the first ground station, the target course being used for instructing an unmanned aerial vehicle to fly from a first location point to a second location point, the target course being generated through the first ground station according to the first location point and the second location point, the first location point being determined through the first ground station, and the second location point being determined through a second ground station;
  a first positioning auxiliary information auxiliary positioning module 320, configured to adjust a flight attitude according to the first positioning auxiliary information, to fly along the target course;
  a second positioning auxiliary information obtaining module 330, configured to, in a case of determining that a ground station switching condition of the second ground station is satisfied, obtain the second positioning auxiliary information sent by the second ground station; and
  a second positioning auxiliary information auxiliary positioning module 340, configured to adjust the flight attitude according to the second positioning auxiliary information, to fly along the target course to reach the second location point, the first ground station and the second ground station including mobile terminals.

According to the embodiments of the present invention, the first positioning auxiliary information sent by the first ground station matching the first location point is received, positioning is performed based on the first positioning auxiliary information, and the flight attitude is adjusted, thereby achieving accurate flight along the target course. In addition, during the flight, the reception of the second positioning auxiliary information sent by the second ground station matching the second location point is switched to, and the flight attitude is adjusted based on the second positioning auxiliary information, thereby achieving accurate flight along the target course. Meanwhile, the first ground station and the second ground station are both mobile terminals. The mobile terminals are used to provide the positioning auxiliary information for the unmanned aerial vehicle respectively, which resolves the problem in the related art that devices providing positioning auxiliary information need to be pre-disposed, leading to the rising positioning costs of the unmanned aerial vehicle. Temporary mobile terminals may be disposed to provide positioning auxiliary information for the unmanned aerial vehicle, thereby improving the positioning accuracy of the unmanned aerial vehicle, and reducing the implementation costs of high-precision positioning of the unmanned aerial vehicle.

Further, the first positioning auxiliary information includes real-time kinematic data, and the second positioning auxiliary information includes real-time kinematic data; the first positioning auxiliary information auxiliary positioning module 320 includes a first positioning information correction unit, configured to: obtain first positioning information, and correct the first positioning information according to the first positioning auxiliary information, to convert the first positioning information into positioning information in a reference coordinate system of the first ground station; and adjust a flight attitude according to the corrected first positioning information and the target course; and the second positioning auxiliary information auxiliary positioning module 340 includes a second positioning information correction unit, configured to: obtain second positioning information, and correct the second positioning information according to the second positioning auxiliary information, to convert the second positioning information into positioning information in a reference coordinate system of the second ground station; and adjust the flight attitude according to the corrected second positioning information and the target course.

Further, the second positioning auxiliary information obtaining module 330 includes a second ground station switching unit, configured to: obtain a signal strength of the first ground station and a signal strength of the second ground station, and determine a target ground station with a higher signal strength; and determine that the ground station switching condition of the second ground station is satisfied in a case of determining that the target ground station is the second ground station.

The foregoing apparatus may perform the method provided in the embodiments of the present invention, and has the corresponding functional modules for performing the method and beneficial effects thereof.

Embodiment 4

Figure 4:
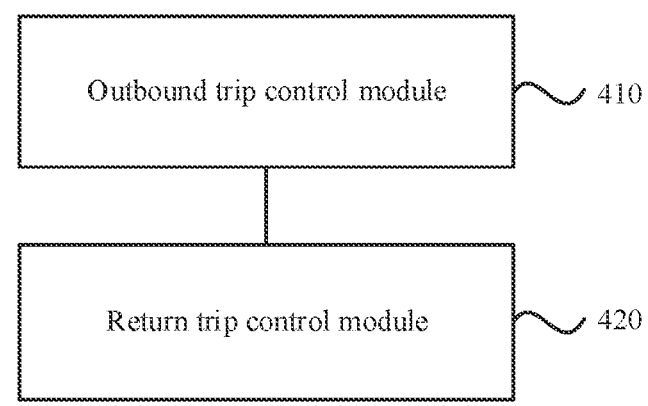
FIG. 4 is a structural diagram of an apparatus for controlling outbound and return trips of an unmanned aerial vehicle according to Embodiment 4 of the present invention.

FIG. 4 is a schematic diagram of an apparatus for controlling outbound and return trips of an unmanned aerial vehicle according to Embodiment 4 of the present invention. Embodiment 4 is a corresponding apparatus for implementing the method for controlling outbound and return trips of an unmanned aerial vehicle provided in the foregoing embodiments of the present invention.

Correspondingly, the apparatus of this embodiment may include:
an outbound trip control module 410, configured to use a first location point as a starting location point, use a second location point as an ending location point, use a target course as a first course, and fly from the starting location point to the ending location point along the first course by using the method for controlling an unmanned aerial vehicle according to any embodiment of the present invention; and
a return trip control module 420, configured to use the first location point as an ending location point, use the second location point as a starting location point, use the target course as a second course, and fly from the ending location point to the starting location point along the second course by using the method for controlling an unmanned aerial vehicle according to any embodiment of the present invention.

According to the embodiments of the present invention, the mobile terminals are used as ground stations, and the foregoing method for controlling an unmanned aerial vehicle is used, so that the unmanned aerial vehicle flies from the starting location point to the ending location point, and then return from the ending location point to the starting location point. Accurate positioning is performed based on the positioning auxiliary information on the courses of the outbound and return trips, which improves the positioning accuracy of the unmanned aerial vehicle, reduces the implementations costs of high-precision positioning of the unmanned aerial vehicle, and ensures accurate flight along the courses, thereby ensuring the accurate operation of the unmanned aerial vehicle.

Further, the outbound trip control module 410 includes an outbound trip no-load control unit, configured to fly from the starting location point to the ending location point along the first course in an unloaded state; and the return trip control module 420 includes a return trip transport control unit, configured to fly from the ending location point to the starting location point along the second course with a to-be-transported cargo carried, the to-be-transported cargo being unloaded at the starting location point.

Further, the outbound trip control module 410 includes an outbound trip transport control unit, configured to fly from the starting location point to the ending location point along the first course with a to-be-transported cargo carried, the to-be-transported cargo being unloaded at the ending location point; and the return trip control module 420 includes a return trip no-load control unit, configured to fly from the ending location point to the starting location point along the second course in an unloaded state.

The foregoing apparatus may perform the method provided in the embodiments of the present invention, and has the corresponding functional modules for performing the method and beneficial effects thereof.

Embodiment 5

Figure 5:
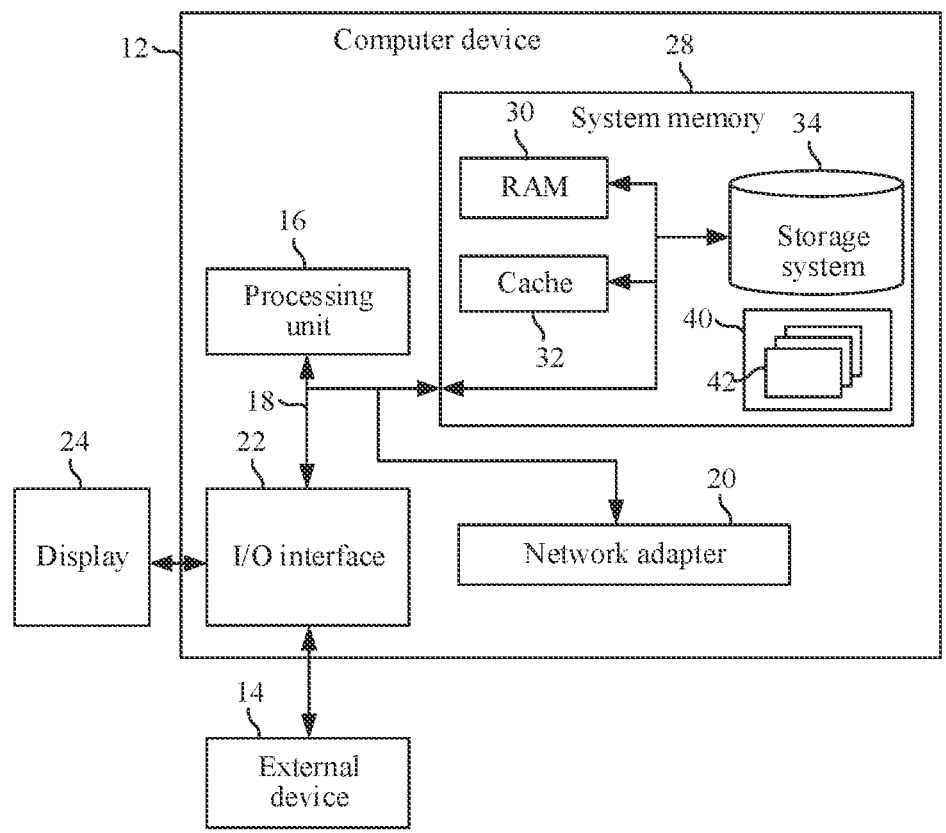
FIG. 5 is a schematic structural diagram of a computer device according to Embodiment 5 of the present invention.

FIG. 5 is a schematic structural diagram of a computer device according to Embodiment 5 of the present invention. FIG. 5 is a block diagram of an exemplary computer device 12 adapted to implement an implementation of the present invention. The computer device 12 shown in FIG. 5 is only an example, and should not impose any limitation on the functions and scope of use of the embodiments of the present invention. The computer device 12 is an unmanned aerial vehicle.

As shown in FIG. 5, the computer device 12 is shown in the form of a general computer device. Components of the computer device 12 may include, but are not limited to: one or more processors or processing units 16, a system memory 28, a bus 18, configured to be connected to different system components (including the system memory 28, and the processing unit 16). The computer device 12 may be a device attached to the bus.

The bus 18 indicates one or more of several types of bus structures, including a memory bus or memory controller, a peripheral bus, an accelerated graphics port, a processor, or a local bus using any of a plurality of bus architectures. For example, such architectures include, but are not limited to an industrial standard architecture (ISA) bus, a micro channel architecture (MCA) bus, an enhanced ISA bus, a video electronics standards association (VESA) local bus, and a peripheral component interconnection (PCI) bus.

The computer device 12 typically includes a plurality of computer system readable media. Such media may be any usable media that can be accessed by the computer device 12, including volatile and non-volatile, removable and non-removable media.

The system memory 28 may include a computer system readable medium in the form of a volatile memory, for example, a random access memory (RAM) 30 and/or a cache memory 32. The computer device 12 may further include another volatile and non-volatile, and removable and non-removable computer system storage medium. Merely taken as an example, a storage system 34 may be configured to read from or write to a non-removable nonvolatile magnetic medium (not shown in FIG. 5, generally referred to as a "hard disk drive"). Although not shown in FIG. 5, a magnetic disk drive that is configured to read from or write to a removable nonvolatile magnetic disk (for example, a "floppy disk"), and an optical disk drive that reads from or writes to a removable nonvolatile optical disk (for example, a compact disc read-only memory (CD-ROM), a digital video disc read only memory (DVD-ROM) or another optical medium) may be provided. In such cases, each drive may be connected to the bus 18 through one or more data medium interfaces. The system memory 28 may include at least one program product. The program product includes a set of (for example, at least one) program modules. The program modules are configured to implement functions of the foregoing embodiments in the present invention.

A program/practical tool 40 including a set of (at least one) program modules 42 may be stored, for example, in the system memory 28. Such program modules 42 include, but are not limited to, an operating system, one or more applications, other program modules, and program data. Each of such examples or a combination thereof may include an implementation of a network environment. The program modules 42 generally implement the functions/methods described in the embodiments of the present invention.

The computer device 12 may alternatively communicate with one or more external devices 14 (for example, a keyboard, a pointing device, and a display 24), may alternatively communicate with one or more devices that enable a user to interact with the computer device 12, and/or communicate with any device (for example, a network card, a modem, etc.) that enables the computer device 12 to communicate with one or more other computing devices. Such communication may be performed by using an input/output (I/O) interface 22. In addition, the computer device 12 may further communicate with one or more networks (for example, a local area network (LAN) or a wide area network (WAN)) by using a network adapter 20. As shown in the figure, the network adapter 20 communicates with other modules through the bus 18 and the computer device 12. It is to be understood that although not shown in FIG. 5, other hardware and/or software modules may be used in combination with the computer device 12, including, but not limited to a microcode, a device driver, a redundant processing unit, an external disk drive array, a redundant arrays of inexpensive disks (RAID) system, a tape drive, a data backup storage system, and the like.

The processing unit 16 performs various functional applications and data processing by running programs stored in the system memory 28, for example, implementing the method according to any embodiment of the present invention.

Embodiment 6

Embodiment 6 of the present invention provides a computer-readable storage medium on which a computer program is stored. The program, when executed by a processor, implements the methods provided in all the inventive embodiments of this application.

That is, the program, when executed by the processor, implements the following steps: obtaining, in a process of flying along a target course sent by a first ground station, first positioning auxiliary information sent by the first ground station, the target course being used for instructing an unmanned aerial vehicle to fly from a first location point to a second location point, the target course being generated through the first ground station according to the first location point and the second location point, the first location point being determined through the first ground station, and the second location point being determined through a second ground station; adjusting a flight attitude according to the first positioning auxiliary information, to fly along the target course; in a case of determining that a ground station switching condition of the second ground station is satisfied, obtaining the second positioning auxiliary information sent by the second ground station; and adjusting the flight attitude according to the second positioning auxiliary information, to fly along the target course to reach the second location point, the first ground station and the second ground station including mobile terminals.

Alternatively, the program implements the following steps: using a first location point as a starting location point, using a second location point as an ending location point, using the target course as a first course, and flying from the starting location point to the ending location point along the first course by using the method according to any embodiment of the present invention; and using the first location point as an ending location point, using the second location point as a starting location point, using the target course as a second course, and flying from the ending location point to the starting location point along the second course by using the method according to any embodiment of the present invention.

The computer readable medium according to the embodiments of the present invention may be any combination of one or more computer readable media. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or component, or any combination thereof. In a more specific example (a non-exhaustive list), the computer-readable storage medium includes an electrical connection having one or more wires, a portable computer magnetic disk, a hard disk, a RAM, a read-only memory (ROM), an erasable programmable read only memory (EPROM), a flash memory, an optical fiber, a portable compact disk read-only memory (CD-ROM), an optical storage medium, a magnetic storage medium, or any suitable combination of the above. In this application, the computer-readable storage medium may be any tangible medium including or storing a program, and the program may be used by or used in combination with an instruction execution system, an apparatus, or a device.

The computer-readable signal medium may include a data signal being in a baseband or propagated as a part of a carrier, the data signal carrying computer-readable program code. The propagated data signal may be in a plurality of forms, including but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device.

The program code included in the computer-readable medium may be transmitted by using any suitable medium, including but not limited to, wireless transmission, a wire, a cable, radio frequency (RF) or the like, or any other suitable combination thereof.

Computer program code used for performing the operations in the present invention may be written by using one or more programming languages or a combination thereof. The programming language includes an object-oriented programming language such as Java, Smalltalk, C++, and a conventional procedural programming language such as "C" language or a similar programming language. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a LAN or a WAN, or may be connected to an external computer (for example, through the Internet by using an Internet service provider).

Embodiment 7

Figure 6:
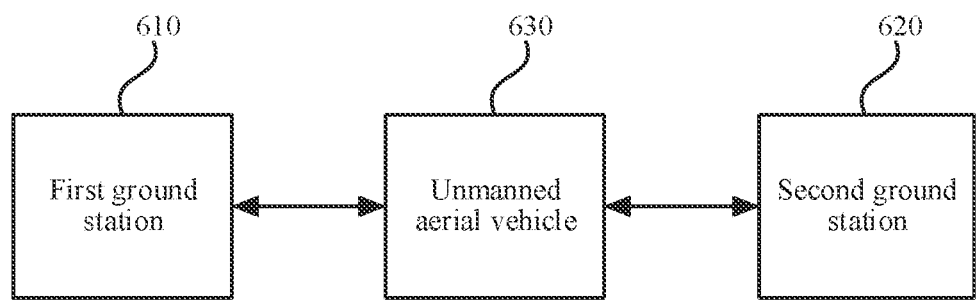
FIG. 6 is a schematic structural diagram of a system for controlling an unmanned aerial vehicle according to Embodiment 7 of the present invention.

FIG. 6 is a schematic diagram of a system for controlling an unmanned aerial vehicle according to Embodiment 7 of the present invention. As shown in FIG. 6, the system for controlling an unmanned aerial vehicle includes: a first ground station 610, a second ground station 620, and an unmanned aerial vehicle 630 according to any embodiment of the present invention, where the first ground station 610 is configured to provide first positioning auxiliary information for the unmanned aerial vehicle 630;

the second ground station 620 is configured to provide second positioning auxiliary information for the unmanned aerial vehicle 630; and the unmanned aerial vehicle 630 is configured to: adjust a flight attitude according to the first positioning auxiliary information, obtain, in a process of flying along a target course, the second positioning auxiliary information sent by the second ground station 620 in a case of determining that a ground station switching condition of the second ground station 620 is satisfied, adjust the flight attitude according to the second positioning auxiliary information, and continue to fly along the target course, to fly from a first location point to a second location point, the target course being generated through the first ground station 610 according to the first location point and the second location point, the first location point being determined through the first ground station 610, the second location point being determined through the second ground station 620, and the first ground station 610 and the second ground station 620 including mobile terminals.

It should be noted that, for content not described in detail in this embodiment, refer to the descriptions in the foregoing embodiment.

In the system for controlling an unmanned aerial vehicle, the first ground station 610, the second ground station 620, and the unmanned aerial vehicle 630 are all equipped with real-time kinematic modules, to ensure that each device has the same positioning method and reduce the problem of decreased positioning accuracy caused by different positioning methods, thereby ensuring the positioning accuracy.

Optionally, the first ground station is configured with a real-time kinematic module, and the second ground station is configured with a real-time kinematic module; the first ground station performs positioning through the real-time kinematic module working in a base mode, and sends the first positioning auxiliary information through the real-time kinematic module working in a rover mode; the second ground station performs positioning through the real-time kinematic module working in the base mode, and sends the second positioning auxiliary information through the real-time kinematic module working in the rover mode; and the first ground station and the second ground station communicate in a manner of mobile communication.

Figure 7:
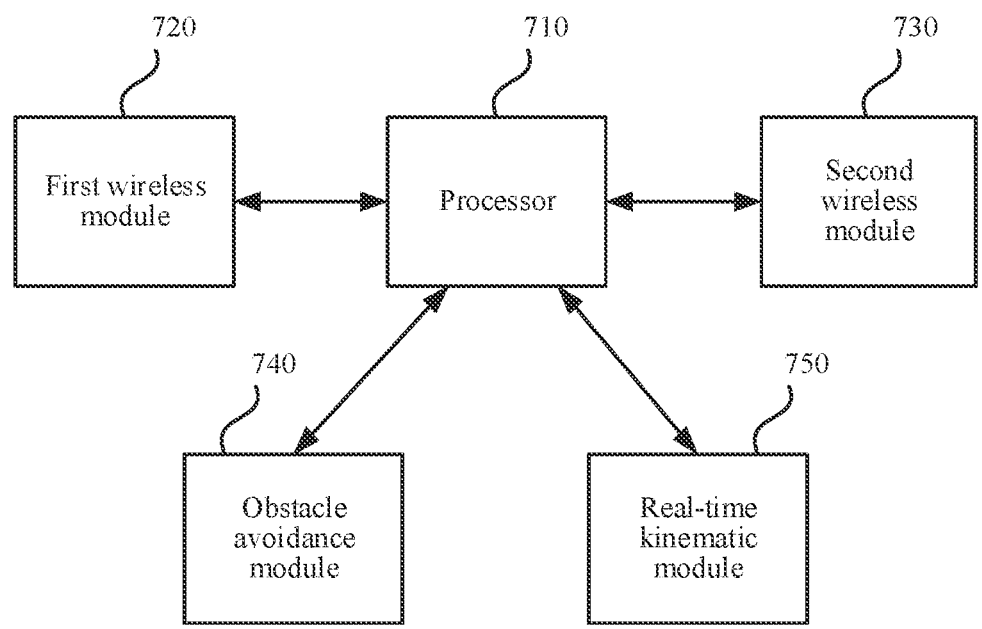
FIG. 7 is a schematic structural diagram of an unmanned aerial vehicle according to Embodiment 7 of the present invention.

A schematic structural diagram of the unmanned aerial vehicle may be shown in FIG. 7. The unmanned aerial vehicle includes a processor 710, configured to receive and process data transmitted by each module; a first wireless module 720, configured to communicate with the first ground station; a second wireless module 730, configured to communicate with the second ground station; an obstacle avoidance module 740, configured to detect and avoid obstacles during flight; and a real-time kinematic module 750, where the unmanned aerial vehicle processes RTCM signals through the real-time kinematic module 750.

Figure 8:
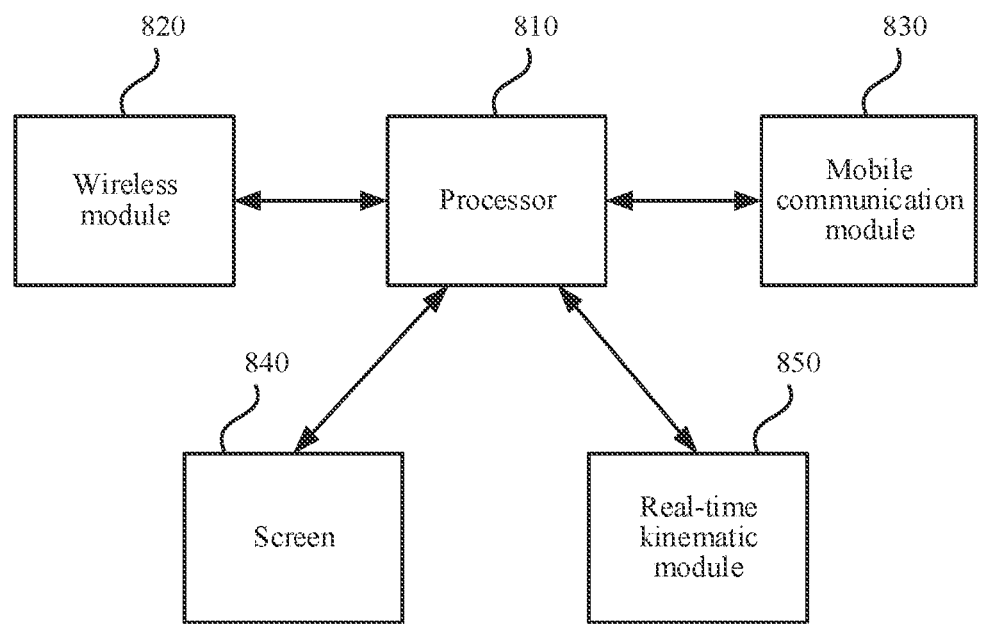
FIG. 8 is a schematic structural diagram of a ground station according to Embodiment 7 of the present invention.

A schematic structural diagram of a ground station may be shown in FIG. 8. The ground station includes a processor 810, configured to receive and process data transmitted by each module; a wireless module 820, configured to communicate with the unmanned aerial vehicle; a mobile communication module 830, configured to communicate with other ground stations; a screen 840, configured to interact with the user, receive instructions from the user, and display data to the user; and a real-time kinematic module 850, where the ground station processes RTCM signals through the real-time kinematic module 850.

It should be noted that, the module may refer to an integrated circuit. The obstacle avoidance module 740 may further include an ultrasonic ranging device, configured on the nose of the unmanned aerial vehicle and configured to detect the direction of the nose, that is, whether there are obstacles in a navigation direction of the unmanned aerial vehicle, and obtain a distance between the nose of the unmanned aerial vehicle and a nearest obstacle.

In addition, the system for controlling an unmanned aerial vehicle further includes a server, which is located between the first ground station and the second ground station, and establishes a connection with the first ground station and the second ground station respectively. The two ground stations may transmit data such as location information and courses through the server. The ground stations and the server perform data exchange in a mobile communication manner, for example, an LTE mobile communication manner (long-term evolution of the UMTS technical standard formulated by the 3GPP organization).

The unmanned aerial vehicle and the ground stations communicate through wireless modules, specifically through short-range wireless communication. The unmanned aerial vehicle may establish communication links with the first ground station and the second ground station respectively in the entire flight process, but due to distance and environmental factors, the two communication links may not be connected simultaneously.

The data transmitted between the unmanned aerial vehicle and the ground stations includes real-time kinematic data, unmanned aerial vehicle control instructions, a real-time location and status data of the unmanned aerial vehicle, and the like.

The real-time kinematic data, that is, an RTCM signal, is used for eliminating a positioning error of the unmanned aerial vehicle, ensuring that the positioning accuracy of the unmanned aerial vehicle reaches a centimeter level. The unmanned aerial vehicle may receive real-time kinematic data sent by two ground stations simultaneously, but only use an RTCM signal sent by one of the ground stations to correct the positioning information. More specifically, the unmanned aerial vehicle receives the RTCM signal sent by the ground station through the wireless module, the wireless module sends the RTCM signal to the processor, and the processor forwards the RTCM signal to the real-time kinematic module for calculation to obtain accurate positioning information, that is, the corrected positioning information is sent to the processor.

The unmanned aerial vehicle control instruction includes course data, a take-off instruction, a landing instruction, or the like. However, the unmanned aerial vehicle only executes a control instruction sent by one of the ground stations at the same time. The unmanned aerial vehicle control instruction may be inputted by the user to the ground station through the screen of the ground station, and then forwarded to the unmanned aerial vehicle by the ground station.

The real-time location and the status data of the unmanned aerial vehicle are used for the unmanned aerial vehicle to display the real-time status and the real-time location, so that the ground stations can monitor the unmanned aerial vehicle, and are displayed to the user, so that the user can monitor the unmanned aerial vehicle in real time, ensuring the normal and safe navigation of the unmanned aerial vehicle. When establishing the communication links with the two ground stations, the unmanned aerial vehicle may send the real-time location and the status data of the unmanned aerial vehicle to the two ground stations simultaneously, so that both ground stations can see information such as the status, a flight track, and a current location of the unmanned aerial vehicle.

It should be noted that, to ensure the flight safety of the unmanned aerial vehicle, the unmanned aerial vehicle only uses an RTCM signal and a control instruction sent by one of the ground stations at the same time, and the selected ground station may be used as a main control station. Specifically, the selection of the main control station may be performed through the method for switching a positioning auxiliary information source shown in FIG. 1B.

Optionally, the first ground station is configured to receive positioning information of the unmanned aerial vehicle at a first location and determine the first location point; and the second ground station is configured to perform positioning at a second location, obtain the second location point, and send the second location point to the first ground station, so that the first ground station generates the target course according to the second location point and the first location point; and is configured to send second positioning auxiliary information to the unmanned aerial vehicle when moving from the second location point to a fixed location point within a preset region range.

The preset region range may refer to a region near the second location point and within a specific distance. The fixed location point may refer to a location point at which the second ground station is temporarily fixed before the unmanned aerial vehicle finishes flying. The fixed location point within the preset region range is used for ensuring that the second ground station is not too close to a landing point of the unmanned aerial vehicle to affect the landing of the unmanned aerial vehicle, thereby ensuring the safety of the unmanned aerial vehicle, and ensuring that the second ground station is not too far away from the unmanned aerial vehicle to fail to communicate with the unmanned aerial vehicle normally, thereby ensuring the positioning accuracy of the unmanned aerial vehicle.

The unmanned aerial vehicle moves to a location corresponding to the first location point in advance, and the first ground station remains stationary in a region near the location. The unmanned aerial vehicle obtains the corrected positioning information according to the real-time kinematic data in the first positioning auxiliary information sent by the first ground station and sends the corrected positioning information to the first ground station The first ground station uses the corrected positioning information as a take-off location point, that is, the first location point.

The second location point is determined by the second ground station. Specifically, the second ground station moves to a location corresponding to the second location point in advance, and performs positioning to obtain positioning information, which is used as a landing location point of the unmanned aerial vehicle, that is, the second location point. After determining the second location point, the second ground station moves to a nearby region and remains stationary. The second ground station sends the information about the second location point to the first ground station through mobile communication (forwarded by the server).

The real-time kinematic module included in the ground station includes two modes: a rover mode and a base mode.

According to the rover mode, the real-time kinematic module of the ground station sends the RTCM signal to the processor, the processor sends the RTCM signal to the wireless module, and the wireless module sends the RTCM signal to the unmanned aerial vehicle.

According to the base mode, the real-time kinematic module of the ground station obtains the latitude and longitude of a location thereof, where there is a specific error in the positioning information.

Correspondingly, when the second ground station is at the second location point, the real-time kinematic module switches to the base mode to obtain positioning information thereof. When the second ground station is at the fixed location point, the real-time kinematic module switches to the rover mode to provide positioning auxiliary information to the unmanned aerial vehicle.

It may be understood that the second location point is detected by the second ground station, that is, location coordinates of the second location point are location coordinates in the reference coordinate system established by the second ground station. The first ground station receives the second location point, and in this case, the location coordinates of the second location point are location coordinates in the reference coordinate system established by the first ground station. Actually, the location coordinates of the second location point in the reference coordinate system established by the second ground station may be the same as or different from the location coordinates in the reference coordinate system established by the first ground station. If the location coordinates are different, the positioning of the second location point is deviated, especially when the unmanned aerial vehicle switches to obtaining the second positioning auxiliary information sent by the second ground station to correct the positioning, the adjustment of the flight attitude of the unmanned aerial vehicle is impacted. Therefore, it is necessary to ensure that there are no obstacles at a set distance in front of the course of the unmanned aerial vehicle during switching, to avoid a sudden change of the flight attitude caused by the switching, which leads to a safety accident of the unmanned aerial vehicle, thereby ensuring the flight safety of the unmanned aerial vehicle.

The first ground station receives the first location point and the second location point, and generates a straight line from the first location point to the second location point as a target course.

As can be learned from the foregoing description, a location obtained by the ground station only includes the latitude and longitude. Therefore, the target course is only a course on the latitude and longitude, and does not include height information. The unmanned aerial vehicle may select to raise or descend.

The first ground station is placed near the take-off point of the unmanned aerial vehicle and remains fixed, and provides the first positioning auxiliary information for the unmanned aerial vehicle to assist the unmanned aerial vehicle to perform accurate positioning. The second ground station moves to the second location point in advance to perform positioning, obtains the coordinates of the second location point, moves to the fixed location point to remain fixed, and sends the second positioning auxiliary information to the unmanned aerial vehicle to assist the unmanned aerial vehicle to perform accurate positioning, which can reduce the costs of constructing a fixed reference base station, thereby reducing the implementation costs of high-precision positioning of the unmanned aerial vehicle.

In a specific example, the unmanned aerial vehicle flies from the starting location point to the ending location point in an unloaded state, and transports a cargo from the ending location point to the starting location point. The unmanned aerial vehicle is at the first location point, and the first ground station is near the first location point. The second ground station is near the second location point. In the outbound and return trip of the unmanned aerial vehicle, the specific workflow of the system for controlling an unmanned aerial vehicle is as follows:

The user starts the second ground station, so that the second ground station is turned on, and sets the built-in real-time kinematic module of the second ground station to the base mode.

The user searches for a suitable landing location for the unmanned aerial vehicle nearby, and after confirmation, places the second ground station at this location, which is the second location point. The second ground station invokes the real-time kinematic module to obtain longitude and latitude information thereof as the coordinates of the second location point.

The second ground station sends a cargo transportation request to the server through a built-in mobile communication module (the mobile communication may be 4G), where the request includes the information about the second location point.

The user places the second ground station at a fixed location near the second location point (the distance is 10 m), and remains the second ground station fixed. Afterwards, in the whole process, the location is not changed until the unmanned aerial vehicle returns to and lands at the first location point.

The user sets a working mode of the built-in real-time kinematic module of the second ground station moved to the fixed location as the rover mode.

After receiving the cargo transportation request sent by the second ground station, the server forwards the request to the first ground station.

After the first ground station receives the cargo transportation request, the user moves the unmanned aerial vehicle to a suitable take-off location. The first ground station extracts the second location point from the cargo transportation request.

The user places the first ground station at a distance (for example, the distance is 10 m) from the unmanned aerial vehicle, and remains the first ground station fixed. Afterwards, in the whole process, the location is not changed until the unmanned aerial vehicle returns to and lands at the first location point.

A working mode of the built-in real-time kinematic module of the first ground station is set to the rover mode.

The user turns on the unmanned aerial vehicle. The unmanned aerial vehicle establishes a communication connection with the first ground station and the second ground station respectively, and determines which ground station is the main control station, that is, determines positioning auxiliary information source of which ground station is obtained to perform auxiliary positioning, which may be determined by using the method shown in FIG. 1b. Since the distance between the first ground station and the unmanned aerial vehicle is closer than the distance between the second ground station and the unmanned aerial vehicle, the signal strength of the first ground station is higher than that of the second ground station. In this case, the unmanned aerial vehicle determines the first ground station to be the main control station, that is, the unmanned aerial vehicle obtains the first positioning auxiliary information sent by the first ground station for auxiliary positioning, to adjust the flight attitude.

The unmanned aerial vehicle obtains current latitude and longitude information thereof through the built-in real-time kinematic module, that is, the first location point, and sends the first location point to the first ground station through the first wireless module. In this case, the unmanned aerial vehicle uses the first ground station as the positioning auxiliary information (RTCM signal) source. Therefore, the location coordinates of the first location point are based on the location of the first ground station, that is, the first location point is the location coordinates in the reference coordinate system established by the first ground station.

The first ground station generates a straight line from the first location point to the second location point according to the first location point and the second location point as the first course, and sends the first course to the unmanned aerial vehicle. The first course only defines the latitude and longitude information, and does not define the flight height. The first ground station extracts the second location point from the cargo transportation request. Since the second location point is determined by the second ground station, the second location point is actually location coordinates in the reference coordinate system established by the second ground station. After the first ground station obtains the second location point, the second location point is directly used as the location coordinates in the reference coordinate system established by the first ground station without coordinate system conversion. Therefore, the second location point obtained by the first ground station may have a specific deviation from the actual second location point.

The user enters an unmanned aerial vehicle take-off control instruction to the first ground station, and the first ground station generates a take-off instruction and sends the take-off instruction to the unmanned aerial vehicle. The unmanned aerial vehicle takes off vertically. The unmanned aerial vehicle takes off to a preset height (for example, 50 m) from the ground and hovers, and performs a yaw operation to orient the nose toward the second location point.

The unmanned aerial vehicle detects whether there is an obstacle within a preset distance (for example, 30 m) in front of the nose, and if there is an obstacle, continues to raise a preset height (for example, 10 m) until no obstacle is detected.

The unmanned aerial vehicle flies along the first course.

During the flight along the first course, the unmanned aerial vehicle continuously detects whether there is an obstacle within a preset distance in front of the nose, and if there is an obstacle, continues to raise a preset height until there is no obstacle.

During the flight along the first course, the unmanned aerial vehicle continuously determines whether it is necessary to switch the positioning auxiliary information source, to complete the process of switching the positioning auxiliary information source from the first ground station to the second ground station.

When the positioning auxiliary information source is switched, the deviation of the course may occur due to the change of the reference coordinate system. In this case, the unmanned aerial vehicle first hovers, then performs the yaw operation, to point the direction of the nose to the second location point in the reference coordinate system of the second ground station, and continues to fly.

When the unmanned aerial vehicle has sailed the first course (that is, has flown over the second location point), the unmanned aerial vehicle hovers.

The unmanned aerial vehicle descends vertically until landing on the ground (the second location point) and reports the first location point to the second ground station. In addition, the second ground station may further receive the first location point sent by the first ground station.

The user loads the cargo onto the unmanned aerial vehicle.

The second ground station generates a straight line from the second location point to the first location point according to the first location point and the second location point as the second course, and sends the second course to the unmanned aerial vehicle. Similarly, the second course is only a course on the latitude and longitude, and does not include height information.

The user enters an unmanned aerial vehicle take-off control instruction to the second ground station, and the second ground station generates a take-off instruction and sends the take-off instruction to the unmanned aerial vehicle. The unmanned aerial vehicle takes off vertically. The unmanned aerial vehicle takes off to a preset height (for example, 50 m) from the ground and hovers, and performs a yaw operation to orient the nose toward the second location point. After the second ground station obtains the first location point, the first location point is directly used as the location coordinates in the reference coordinate system established by the second ground station without coordinate system conversion. Therefore, the first location point obtained by the second ground station may have a specific deviation from the actual first location point.

The unmanned aerial vehicle detects whether there is an obstacle within a preset distance (for example, 30 m) in front of the nose, and if there is an obstacle, continues to raise a preset height (for example, 10 m) until no obstacle is detected.

The unmanned aerial vehicle flies along the second course.

During the flight along the second course, the unmanned aerial vehicle continuously detects whether there is an obstacle within a preset distance in front of the nose, and if there is an obstacle, continues to raise a preset height until there is no obstacle.

During the flight along the second course, the unmanned aerial vehicle continuously determines whether it is necessary to switch the positioning auxiliary information source, to complete the process of switching the positioning auxiliary information source from the second ground station to the first ground station.

When the positioning auxiliary information source is switched, the deviation of the course may occur due to the change of the reference coordinate system. In this case, the unmanned aerial vehicle first hovers, then performs the yaw operation, to point the direction of the nose to the first location point in the reference coordinate system of the first ground station, and continues to fly.

When the unmanned aerial vehicle has sailed the second course (that is, has flown over the first location point), the unmanned aerial vehicle hovers.

The unmanned aerial vehicle descends vertically until landing on the ground (the first location point).

The first ground station sends information that the cargo has been delivered to the first location point to the server.

The server sends the information that the cargo has been delivered to the first location point to the second ground station.

The user unloads the cargo, so that the cargo is transported from the second location point to the first location point.

In addition, there is a case in which the cargo transportation request is to request the unmanned aerial vehicle to transport the cargo from the starting location point to the ending location point, and the fly from the ending location point to the starting location point in the unloaded state. In this case, the difference from the foregoing process lies in different regions and times of loading of the cargo, and different transmission directions of the information that the cargo has been delivered between the first ground station and the second ground station. This is not repeated in the embodiments of the present invention.

By using the system for controlling an unmanned aerial vehicle, the mobile terminals are used as the ground stations to control the outbound and return trip of the unmanned aerial vehicle, to transport the cargo from one location to another. The unmanned aerial vehicle performs accurate positioning based on the positioning auxiliary information, adjusts the flight attitude, and accurately flies along the target course, which improves the positioning accuracy of the unmanned aerial vehicle, and reduces the implementation costs of high-precision positioning of the unmanned aerial vehicle, thereby ensuring accurate flight along the course, and further ensuring the accurate transportation of the unmanned aerial vehicle.

According to the embodiments of the present invention, the mobile terminals are used as the ground stations, and the unmanned aerial vehicle is controlled to correct the positioning information according to the positioning auxiliary information and adjust the flight attitude, to achieve accurate flight along the target course, thereby avoiding the use of pre-disposed reference base stations to provide positioning auxiliary information. The positioning accuracy of the unmanned aerial vehicle is improved, and the implementation costs of high-precision positioning of the unmanned aerial vehicle are reduced.

It should be noted that the above are only preferred embodiments of the present invention and applied technical principles. A person skilled in the art understands that the present invention is not limited to the specific embodiments described herein. Various obvious changes, readjustments and substitutions can be made by a person skilled in the art without departing from the protection scope of the present invention. Therefore, although the present invention is described in detail through the foregoing embodiments, the present invention is not limited to the foregoing embodiments, and may further include more other equivalent embodiments without departing from the concept of the present invention. The scope of the present invention is determined by the scope of the appended claims.

What is claimed is:

1. A method for controlling an unmanned aerial vehicle, applicable to an application scenario without a pre-disposed reference base station, the method comprising:

obtaining, in a process of flying along a target course sent by a first ground station, first positioning auxiliary information sent by the first ground station, the target course being used for instructing the unmanned aerial vehicle to fly from a first location point to a second location point, the target course being generated through the first ground station according to the first location point and the second location point, the first location point being determined through the first ground station, and the second location point being determined through a second ground station, wherein the first ground station is configured to receive positioning information of the unmanned aerial vehicle at a first location and determine the first location point, the positioning information of the unmanned aerial vehicle at the first location being obtained through positioning by a real-time kinematic module in the unmanned aerial vehicle; the second ground station is configured to perform positioning at a second location, obtain the second location point, and send the second location point to the first ground station, so that the first ground station generates the target course according to the second location point and the first location point; and is configured to send second positioning auxiliary information to the unmanned aerial vehicle when moving from the second location point to a fixed location point within a preset region range; the first ground station is configured with a real-time kinematic module, and the second ground station is configured with a real-time kinematic module; the first ground station performs positioning through the real-time kinematic module working in a base mode, and sends the first positioning auxiliary information through the real-time kinematic module working in a rover mode; the second ground station performs positioning through the real-time kinematic module working in the base mode, and sends the second positioning auxiliary information through the real-time kinematic module working in the rover mode; and the first ground station and the second ground station communicate in a manner of mobile communication;

obtaining first positioning information, and correcting the first positioning information according to the first positioning auxiliary information, to convert the first positioning information into positioning information in a reference coordinate system of the first ground station, the target course being a course generated through the first location point in the reference coordinate system established by the first ground station and the second location point in the reference coordinate system established by the first ground station;

adjusting a flight attitude according to the corrected first positioning information and the target course, to fly along the target course;

in a case of determining that a ground station switching condition of the second ground station is satisfied, stopping flying, hovering at a current location point, and obtaining the second positioning auxiliary information sent by the second ground station;

obtaining second positioning information, and correcting the second positioning information according to the second positioning auxiliary information, to convert the second positioning information into positioning information in a reference coordinate system of the second ground station;

adjusting the flight attitude according to the corrected second positioning information and the target course, all flight points of the target course at a current moment being coordinate locations in the reference coordinate system established by the second ground station, and the target course being switched from flying from the first location point in the reference coordinate system established by the first ground station to the second location point in the reference coordinate system established by the first ground station to flying from the first location point in the reference coordinate system established by the first ground station to the current location point, and flying from the current location point to the second location point in the reference coordinate system established by the second ground station; and ending the hovering, and continuing to fly in an adjusted flight direction, to fly along the target course to reach the second location point, the first ground station and the second ground station comprising mobile terminals, the first positioning auxiliary information comprising real-time kinematic data, and the second positioning auxiliary information comprising real-time kinematic data, the determining that a ground station switching condition of the second ground station is satisfied comprising:

obtaining a signal strength of the first ground station and a signal strength of the second ground station, and determining a target ground station with a higher signal strength; and determining that the ground station switching condition of the second ground station is satisfied in a case of determining that the target ground station is the second ground station.

2. The method according to claim 1, further comprising:

performing an obstacle detection operation within a set distance range in a forward flight direction during the flight along the target course sent by the first ground station;

raising by a set height vertically in a case of determining that there is an obstacle; and waiting for a preset time, returning to perform the obstacle detection operation, and continuing to fly in the forward flight direction until an obstacle detection result is empty.

3. A method for controlling outbound and return trips of an unmanned aerial vehicle, comprising:

determining a starting location point as a first location point, determining an ending location point as a second location point, determining a first course as a target course, and flying from the starting location point to the ending location point along the first course by using the method for controlling an unmanned aerial vehicle according to claim 1; and determining the ending location point as a first location point, determining the starting location point as a second location point, determining a second course as a target course, and flying from the ending location point to the starting location point along the second course by using the method for controlling an unmanned aerial vehicle.

4. The method according to claim 3, wherein the flying from the starting location point to the ending location point along the first course comprises:

flying from the starting location point to the ending location point along the first flying from the starting location point to the ending location point along the first course in an unloaded state; and the flying from the ending location point to the starting location point along the second course comprises:

flying from the ending location point to the starting location point along the second flying from the ending location point to the starting location point along the second course with a to-be-transported cargo carried, the to-be-transported cargo being unloaded at the starting location point.

5. The method according to claim 3, wherein the flying from the starting location point to the ending location point along the first course comprises:
- flying from the starting location point to the ending location point along the first flying from the starting location point to the ending location point along the first course with a to-be-transported cargo carried, the to-be-transported cargo being unloaded at the ending location point; and
- the flying from the ending location point to the starting location point along the second course comprises:
- flying from the ending location point to the starting location point along the second flying from the ending location point to the starting location point along the second course in an unloaded state.

6. The method according to claim 3, wherein before the flying from the starting location point to the ending location point along the first course, the method further comprises:
- obtaining, in a case of determining a take-off location point, coordinates of the location point as the starting location point, the coordinates being obtained through positioning by a real-time kinematic module.

7. The method according to claim 6, wherein before the flying from the starting location point to the ending location point along the first course, the method further comprises:
- using a first ground station as a starting point ground station, and using a second ground station as an end-point ground station;
- sending the starting location point to the starting point ground station to instruct the starting point ground station to generate the first course according to the received ending location point sent by the endpoint ground station and the starting location point; and
- receiving the first course.

8. The method according to claim 6, wherein before the flying from the ending location point to the starting location point along the second course, the method further comprises:
- sending the starting location point to a ground station associated with the ending location point to instruct the ground station associated with the ending location point to generate the second course according to the predetermined ending location point and the starting location point; and
- receiving the second course.

9. An unmanned aerial vehicle, comprising a memory, a processor, and a computer program stored in the memory and executable on the processor, the processor, when executing the program, implementing the method for controlling an unmanned aerial vehicle according to claim 1.

10. A computer-readable storage medium, storing a computer program, the program, when executed by a processor, implementing the method for controlling an unmanned aerial vehicle according to claim 1.

11. A system for controlling an unmanned aerial vehicle, comprising: a first ground station, a second ground station, and the unmanned aerial vehicle according to claim 9, wherein
- the first ground station is configured to provide first positioning auxiliary information for the unmanned aerial vehicle;
- the second ground station is configured to provide second positioning auxiliary information for the unmanned aerial vehicle; and
- the unmanned aerial vehicle is configured to: adjust a flight attitude according to the first positioning auxiliary information, obtain, in a process of flying along a target course, the second positioning auxiliary information sent by the second ground station in a case of determining that a ground station switching condition of the second ground station is satisfied, adjust the flight attitude according to the second positioning auxiliary information, and continue to fly along the target course, to fly from a first location point to a second location point, the target course being generated through the first ground station according to the first location point and the second location point, the first location point being determined through the first ground station, the second location point being determined through the second ground station, and the first ground station and the second ground station comprising mobile terminals.

12. A method for controlling outbound and return trips of an unmanned aerial vehicle, comprising:
- determining a starting location point as a first location point, determining an ending location point as a second location point, determining a first course as a target course, and flying from the starting location point to the ending location point along the first course by using the method for controlling an unmanned aerial vehicle according to claim 2; and
- determining the ending location point as a first location point, determining the starting location point as a second location point, determining a second course as a target course, and flying from the ending location point to the starting location point along the second course by using the method for controlling an unmanned aerial vehicle.

13. The method according to claim 12, wherein the flying from the starting location point to the ending location point along the first course comprises:
- flying from the starting location point to the ending location point along the first flying from the starting location point to the ending location point along the first course in an unloaded state; and
- the flying from the ending location point to the starting location point along the second course comprises:
- flying from the ending location point to the starting location point along the second flying from the ending location point to the starting location point along the second course with a to-be-transported cargo carried, the to-be-transported cargo being unloaded at the starting location point.

14. The method according to claim 12, wherein the flying from the starting location point to the ending location point along the first course comprises:
- flying from the starting location point to the ending location point along the first flying from the starting location point to the ending location point along the first course with a to-be-transported cargo carried, the to-be-transported cargo being unloaded at the ending location point; and
- the flying from the ending location point to the starting location point along the second course comprises:
- flying from the ending location point to the starting location point along the second flying from the ending location point to the starting location point along the second course in an unloaded state.

15. The method according to claim 12, wherein before the flying from the starting location point to the ending location point along the first course, the method further comprises:
- obtaining, in a case of determining a take-off location point, coordinates of the location point as the starting location point, the coordinates being obtained through positioning by a real-time kinematic module.

16. The method according to claim 15, wherein before the flying from the starting location point to the ending location point along the first course, the method further comprises:
using a first ground station as a starting point ground station, and using a second ground station as an endpoint ground station;
sending the starting location point to the starting point ground station to instruct the starting point ground station to generate the first course according to the received ending location point sent by the endpoint ground station and the starting location point; and
receiving the first course.

17. The method according to claim 15, wherein before the flying from the ending location point to the starting location point along the second course, the method further comprises:
sending the starting location point to a ground station associated with the ending location point to instruct the ground station associated with the ending location point to generate the second course according to the predetermined ending location point and the starting location point; and
receiving the second course.

18. An unmanned aerial vehicle, comprising a memory, a processor, and a computer program stored in the memory and executable on the processor, the processor, when executing the program, implementing the method for controlling an unmanned aerial vehicle according to claim 2.

19. An unmanned aerial vehicle, comprising a memory, a processor, and a computer program stored in the memory and executable on the processor, the processor, when executing the program, implementing the method for controlling outbound and return trips of an unmanned aerial vehicle according to claim 3.

20. A computer-readable storage medium, storing a computer program, the program, when executed by a processor, implementing the method for controlling outbound and return trips of an unmanned aerial vehicle according to claim 3.

* * * * *